United States Patent
Fraser

(10) Patent No.: US 6,328,696 B1
(45) Date of Patent: Dec. 11, 2001

(54) BIAS CHARGE REGULATOR FOR CAPACITIVE MICROMACHINED ULTRASONIC TRANSDUCERS

(75) Inventor: John Douglas Fraser, Woodinville, WA (US)

(73) Assignee: ATL Ultrasound, Inc., Bothell, WA (US)

( * ) Notice: Subject to any disclaimer, the term of this patent is extended or adjusted under 35 U.S.C. 154(b) by 0 days.

(21) Appl. No.: 09/697,995

(22) Filed: Oct. 27, 2000

Related U.S. Application Data

(62) Division of application No. 09/596,759, filed on Jun. 15, 2000.

(51) Int. Cl.[7] ........................................ A61B 8/00
(52) U.S. Cl. ................................ 600/459; 367/118
(58) Field of Search ................................ 367/117, 118; 600/437, 462, 459, 461

(56) References Cited

U.S. PATENT DOCUMENTS

| | | | |
|---|---|---|---|
| 5,744,898 | * 4/1998 | Smith et al. ................... | 600/462 |
| 6,115,326 | * 9/2000 | Puma et al. ................... | 367/118 |

OTHER PUBLICATIONS

"Silicon Ultrasound," Sensant Corporation, 1999.
Ladabaum et al., "Micromachined Ultrasonic Transducers (MUTs)," pp. 501–504, IEEE Ultrasonics Symposium, 1995.
Oralkan et al., "Simulation and Experimental Characterization of a 2–D, 3–MHZ Capacitive Micromachined Ultrasonic Transducer (CMUT) Array Element," Edward L. Ginzton Laboratory, Stanford University.
Haller et al., "A Surface Micromachined Electrostatic Ultrasonic Air Transducer," pp. 1241–1244, IEEE Ultrasonic Symposium, 1994.
Suzuki et al., "A Silicon Electrostatic Ultrasonic Transducer," IEEE Trans. on Ultras., Ferro. and Freq. and Control, vol. 35, No. 6, Nov. 1989, pp. 620–627.
Ladabaum et al., "Surface Micromachined Capacitive Ultrasonic Transducers," IEEE Trans. on Ultras., Ferro., and Freq. Control, vol. 45, No. 3, May 1998, pp. 687–690.
Ladabaum et al., "Microfabricated Ultrasonic Transducers: Towards Robust Models and Immersion Devices," IEEE Ultrasonic Symposium, 1996, pp. 335–338.
Eccardt et al., "Surface Micromachined Ultrasonic Transducers in CMOS Technology," IEEE Ultrasonics Symposium, 1996, pp. 959–962.
Jin et al., "Fabrication and Characterization of Surface Micromachined Capacitive Ultrasonic Immersion Transducers," IEEE Journal of Microelectromechanical Systems, vol. 8, No. 1, Mar. 1999, pp. 100–114.
Schindel et al., "The Design and Characterization of Micromachined Air–Coupled Capacitance Transducers," IEEE Trans. on Ultras. Ferro. and Freq. Control, vol. 42, No. 1, Jan. 1995, pp. 42–50.
Haller et al., "A Surface Micromachined Electrostatic Ultrasonic Air Transducer," IEEE Trans. on Ultras., Ferro. and Freq. Control, vol. 43, No. 1, Jan. 1996, pp. 1–6.

(List continued on next page.)

Primary Examiner—Marvin M. Lateef
Assistant Examiner—Maulin Patel
(74) Attorney, Agent, or Firm—W. Brinton Yorks, Jr.

(57) ABSTRACT

An ultrasonic transducer is formed by a plurality of cMUT cells, each comprising a charged diaphragm plate capacitively opposing an oppositely charged base plate. A feedback controlled bias charge regulator controls the bias charge of the capacitive plates. The cMUT cells can be fabricated by conventional semiconductor processes and hence integrated with ancillary transducer circuitry such as the bias charge regulator.

7 Claims, 5 Drawing Sheets

OTHER PUBLICATIONS

Jin et al., "The Microfabrication of Capacitive Ultrasonic Transducers," IEEE Journal of Microelectromechanical Systems, vol. 7, No. 3, Sep. 1998, pp. 295–302.

Jin et al., "Surface Micromachined Capacitive Ultrasonic Immersion Transducers," IEEE 1998, pp. 649–654.

Jin et al., "The Microfabrication of Capacitive Ultrasonic Transducers," 1997 International COnference on Solid–State Sensor and Actuators, Chicago (IL), Jun. 16–19, 1997, pp. 437–440.

* cited by examiner

BIAS CHARGE REGULATOR FOR CAPACITIVE MICROMACHINED ULTRASONIC TRANSDUCERS

This is a division of U.S. patent application Ser. No. 09/596,759 filed Jun. 15, 2000.

This invention relates to medical ultrasonic imaging systems and, in particular, to capacitive micromachined ultrasonic transducers for such systems.

The ultrasonic transducers used for medical imaging have numerous characteristics which lead to the production of high quality diagnostic images. Among these are broad bandwidth and high sensitivity to low level acoustic signals at ultrasonic frequencies. Conventionally the piezoelectric materials which possess these characteristics and thus have been used for ultrasonic transducers have been made of PZT and PVDF materials, with PZT being the most preferred. However PZT transducers require ceramic manufacturing processes which are uniquely different from the processing technologies used to manufacture the rest of an ultrasound system, which are software and semiconductor intensive. It would be desirable from a manufacturing standpoint to be able to manufacture ultrasonic transducers by the same processes used to fabricate the other parts of an ultrasound system.

Recent developments have led to the prospect that medical ultrasound transducers can be manufactured by semiconductor processes. These developments have produced capacitive micromachined ultrasonic transducers or cMUTs. These transducers are tiny diaphragm-like devices with electrodes that convert the sound vibration of a received ultrasound signal into a modulated capacitance. For transmission the capacitive charge is modulated to vibrate the diaphragm of the device and thereby transmit a sound wave. Since these devices are manufactured by semiconductor processes the devices have dimensions in the 10–200 micron range. However, many such devices can be grouped together and operated in unison as a single transducer element.

Since cMUTs are very small, it is desirable that constructed cMUTs have as great a response to received acoustic signals as possible. A cMUT should desirably exhibit as large a capacitive variation as possible to received signals. One approach to increasing the capacitive variation is to use electrodes only at the center of the cMUT diaphragm which will cause the capacitive charge to be located only at the center of the moving diaphragm. However, this arrangement requires the use of very small conductive paths to the electrodes, which increases the impedance of these paths and thereby limits the response of the cMUT. It is desirable to be able to increase the capacitive variation of a cMUT without the use of such high impedance conductive paths.

One of the advantages of cMUT transducers is that they can be made using semiconductor fabrication processes. Accordingly, cMUTs have been fabricated using silicon and glass substrates for the base of the transducers. These substrates form the back of the transducers opposite the transmitting surface. Since transducers are intended to transmit most of their energy out from the transmitting surface without radiating appreciable acoustic energy out the back of the transducers or into neighboring transducers through lateral coupling, a backing layer is usually applied to a transducer to damp or attenuate this undesired acoustic energy. Accordingly it would be desirable to be able to fabricate cMUTs using materials which are better suited to reducing or eliminating this unwanted energy coupling.

cMUTs have been found to exhibit a response to applied transmit signals which is nonlinear due to the nonlinear electromechanical response of the charged cMUT diaphragm, which causes a corresponding quadratic signal variation. Such a nonlinear response will result in distortion in the transmit signal. This distortion can manifest itself as signal components in the harmonic band of the desired transmit pulse, which can appear in the received echo signal as unwanted interference. It is desirable to prevent such distortion from contaminating received echo signals.

A cMUT transducer is conventionally operated with a bias voltage which causes the transducer to have a range of operation which is not quadratic. The bias voltage must be carefully controlled so as to maintain high transducer sensitivity without short-circuiting the transducer's capacitance. It is desirable to be able to maintain the applied bias in a condition which is stable in the presence of long-term effects that can cause transducer short-circuits.

In accordance with the principles of the present invention a cMUT transducer is described with improved signal response. The improved response arises by reason of a nonplanar floor of the cMUT cell, which concentrates the cellular charge in the vicinity of that portion of the cell diaphragm which is most responsive to applied and received signals. A manufacturing process for cMUT transducers is described which enables the transducer to be fabricated by a technique of micro-stereolithography using polymeric materials. In operation the cMUT is biased by a controlled bias charge rather than a bias voltage. The transmission of unwanted signal components in the harmonic band is minimized by the use of predistorted transmit signals that counteract the transducer's nonlinear response.

Figure 1:
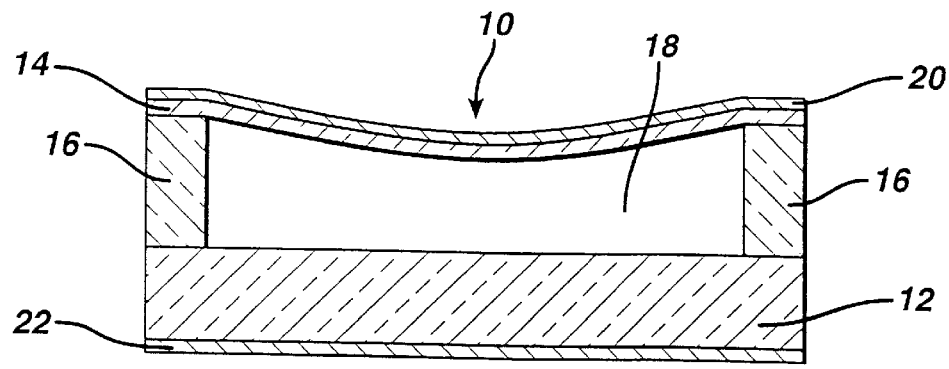
FIG. 1 illustrates a cross-sectional view of a cMUT cell.

Referring first to FIG. 1, a typical cMUT transducer cell 10 is shown in cross-section. The cMUT transducer cell 10 is fabricated along with a plurality of similar adjacent cells on a conductive substrate 12 such as silicon. A membrane or diaphragm 14 which may be made of silicon nitride is supported above the substrate by an insulating support 16 which may be made of silicon oxide or silicon nitride. The cavity 18 between the diaphragm and the substrate may be air or gas-filled or wholly or partially evacuated. A conductive film or layer 20 such as gold forms an electrode on the diaphragm, and a similar film or layer 22 forms an electrode on the substrate. These two electrodes, separated by the dielectric cavity 18, form a capacitance. When an acoustic signal causes the diaphragm to vibrate the variation in the capacitance can be detected, thereby transducing the acoustic wave. Conversely, an applied a.c. signal will modulate the capacitance, causing the diaphragm to move and thereby transmit an acoustic signal.

Due to the micron-size dimensions of a typical cMUT, numerous cMUT cells are typically fabricated in close proximity to form a single transducer element. The individual cells can have round, rectangular, or other peripheral shapes. In a preferred embodiment the individual cells have hexagonal shapes to promote dense packing of the cMUT cells of a transducer element. The cMUT cells can have different dimensions so that the transducer element will have composite characteristics of the different cell sizes, giving the transducer a broad band characteristic.

Figure 2:
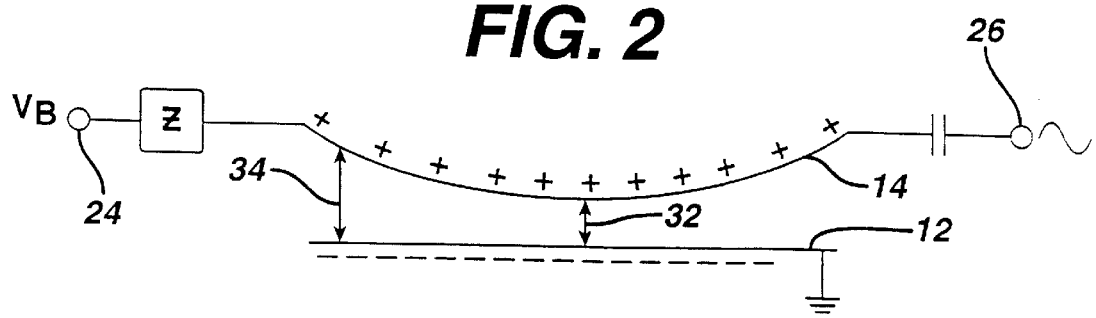
FIG. 2 illustrates the biasing of the diaphragm of a cMUT cell.

The cMUT is inherently a quadratic device so that the acoustic signal is normally the harmonic of the applied signal, that is, the acoustic signal will be at twice the frequency of the applied electrical signal frequency. To prevent this quadratic behavior a bias voltage is applied to the two electrodes which causes the diaphragm to be attracted to the substrate by the resulting coulombic force. This is shown schematically in FIG. 2, where a DC bias voltage $V_B$ is applied to a bias terminal 24 and is coupled to the diaphragm electrode by a path which poses a high impedance Z to a.c. signals such as an inductive impedance. A.C. signals are capacitively coupled to and from the diaphragm electrode from a signal terminal 26. The positive charge on the diaphragm 14 causes the diaphragm to distend as it is attracted to the negative charge on the substrate 12. The device only weakly exhibits the quadratic behavior when operated continuously in this biased state.

It has been found that the cMUT is most sensitive when the diaphragm is distended so that the two oppositely charged plates of the capacitive device are as close together as possible. A close proximity of the two plates will cause a greater coupling between acoustic and electrical signal energy by the cMUT. Thus it is desirable to increase the bias voltage $V_B$ until the dielectric spacing 32 between the diaphragm 14 and substrate 12 is as small as can be maintained under operating signal conditions. In constructed embodiments this spacing can be on the order of one micron or less. If the applied bias voltage is too great, however, the diaphragm can contact the substrate, short-circuiting the device as the two plates of the device are stuck together by VanderWals forces. This sticking should be avoided when choosing a bias voltage for the device.

Even when the diaphragm is biased to cause a very small sub-micron dielectric spacing, the sensitivity of the cMUT can be less than that which is desired. That is due to the fact that, whereas the charge at the center of the diaphragm is relatively close to and will move considerably in relation to the opposing charge, the charge at the periphery 34 of the diaphragm where the diaphragm is supported by the support 16 will move very little and hence have little participation in the transduction of signal by the device. One approach to eliminating this disparity has been to use a small diaphragm electrode which does not extend to the supports 16. This restricts the charge on the diaphragm electrode to the center of the device where it will participate strongly in the motion of the diaphragm and hence the transduction by the device. There still must be one or more electrical conductors to apply the bias voltage to the diaphragm electrode and to couple the a.c. signals to and from the electrode. These electrical conductors are necessarily very thin, with dimensions that impose undesirably large impedances on the a.c. signals, thereby limiting the sensitivity of the device.

Figure 3:
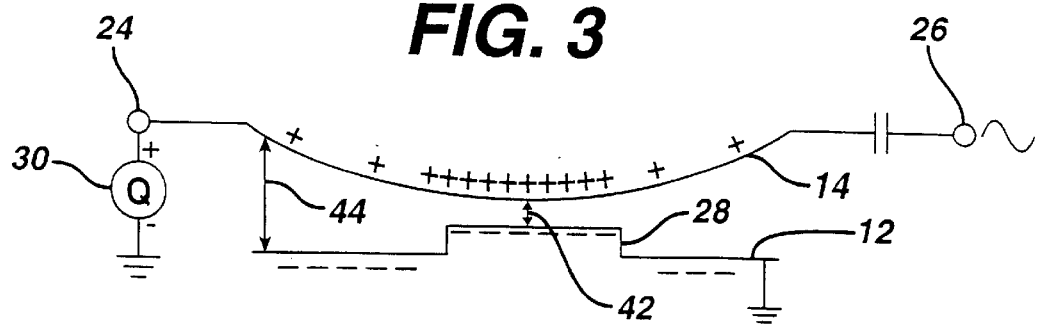
FIG. 3 illustrates the construction of a cMUT cell in accordance with the principles of the present invention.

In accordance with the principles of one aspect of the present invention, the sensitivity of the cMUT device is improved without the use of small electrodes or high impedance paths to such electrodes. This is done by increasing the ratio of the support spacing 44 to the dielectric spacing 42 by means of a nonplanar substrate. In the embodiment schematically shown in FIG. 3, the nonplanar substrate comprises a raised area or pedestal 28 on the substrate 12. Alternatively the nonplanar substrate can taper to a peak in the center of the device. The diaphragm electrode will continue to cover the full diaphragm or be electrically connected by relatively wide, low impedance conductors, thereby obviating the coupling problems of high impedance conductors. Since the two electrodes are closely spaced in the center of the device, the charge density will be greatest in the center of the device as shown by the closely spaced positive charge in FIG. 3. The capacitive plates of the cMUT device are charged by a charge source 30 coupled to the bias terminal 24. Thus, acoustic vibrations received by the diaphragm will cause a relatively large modulation of the device capacitance and hence a relatively high degree of transducer coupling, providing a highly efficient cMUT device.

The nonplanar floor of the cell can be formed by starting with a substrate with raised areas about which the cells are fabricated, or by leaving a raised center on the substrate when the cavity 18 between the diaphragm and substrate is formed, or by depositing raised areas during fabrication of the cells. A process which uses the latter approach is shown in FIGS. 4a–4j. Fabrication of the cMUT device starts with a silicon substrate 50 [FIG. 4a] which is treated to be highly conductive and thus serve as one plate of a capacitance. A layer 52 of a strongly conductive or high dielectric constant material is deposited on the silicon substrate 50 [FIG. 4b]. This material preferably exhibits a high dielectric constant such as strontium titanate, or can be a refractory metal that makes good contact with silicon such as gold or platinum or doped silicon, for example. A photoresist film (not shown) is applied to the surface of the conductive layer 52 and the resist film is lithographically or E beam patterned. The conductive layer is then etched to form raised areas 28 on the substrate and the resist is removed [FIG. 4c]. Two oxide layers 54a, 54b are then laid over the substrate. The first oxide layer 54a is thermally grown, and since thermal oxidation consumes silicon the raised areas will be elevated further by the process [FIG. 4d]. A second oxide layer 54b is then deposited over the first layer 54a and the pedestals 28. The thickness of this second layer 54b determines the unbiased dielectric spacing between the diaphragm and the pedestal. Another resist film layer (not shown) is applied to the silicon dioxide layer 54b, which is lithographically or E beam patterned and etched to form circular, square, hexagonal or other shaped channels 56, separating the oxide layers into shaped silicon dioxide islands 58 [FIG. 4e] and the resist is removed. This channeling process defines the shape or shapes of the individual cMUT cells of the transducer. A silicon nitride film 60 is then deposited over the silicon dioxide layers [FIG. 4f]. A resist film is applied over the silicon nitride film and is lithographically or E beam patterned and etched to form apertures 62 which extend down to the upper silicon dioxide layer 54b [FIG. 4g]. The resist is then removed.

Figure 4A:
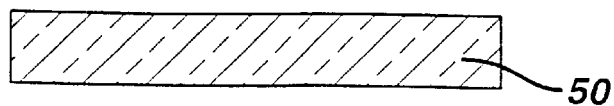
FIGS. 4a–4j illustrate the fabrication of a cMUT transducer in accordance with the principles of the present invention.
Figure 4B:
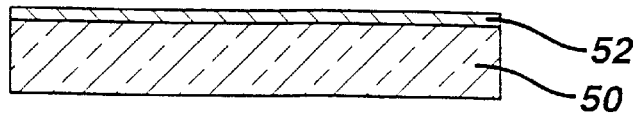
Figure 4C:
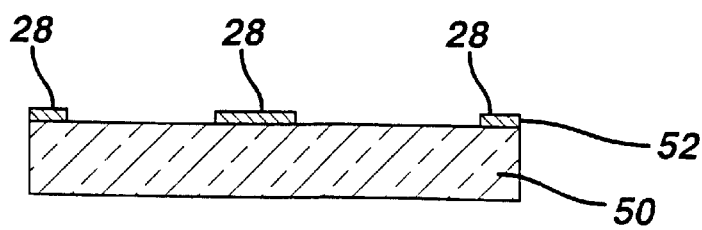
Figure 4D:
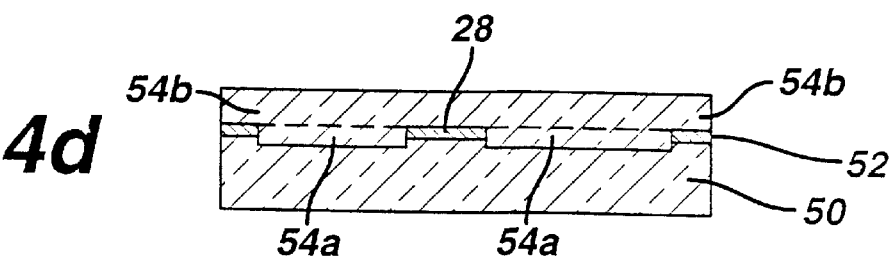
Figure 4E:
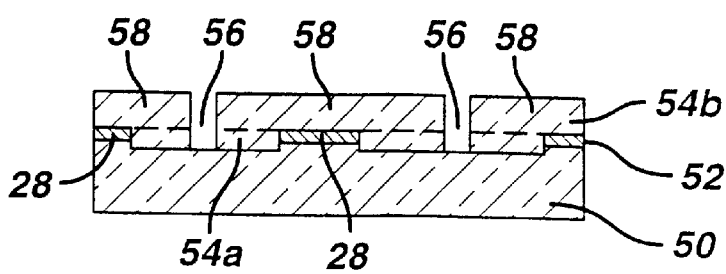
Figure 4F:
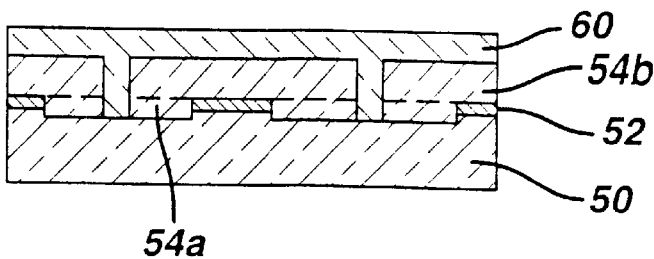
Figure 4G:
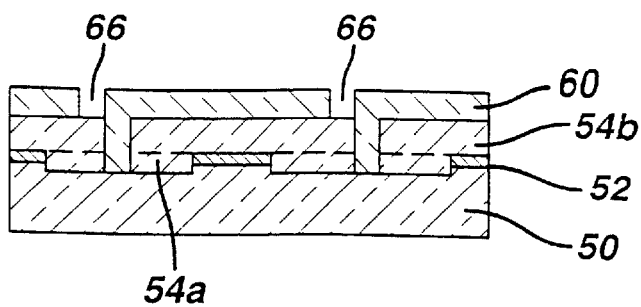
Figure 4H:
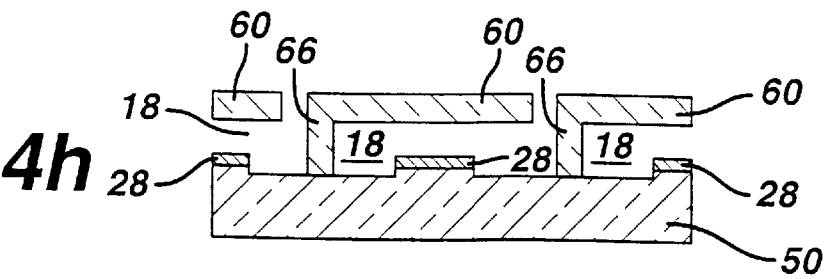
Figure 4I:
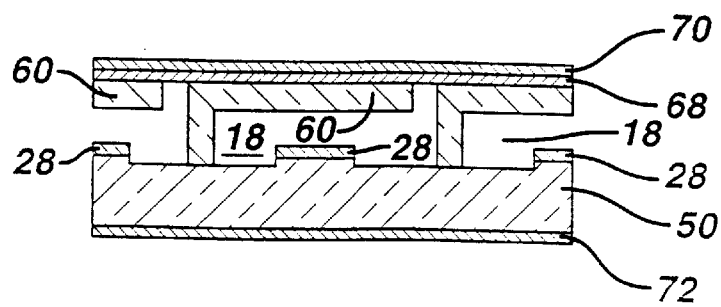
Figure 4J:
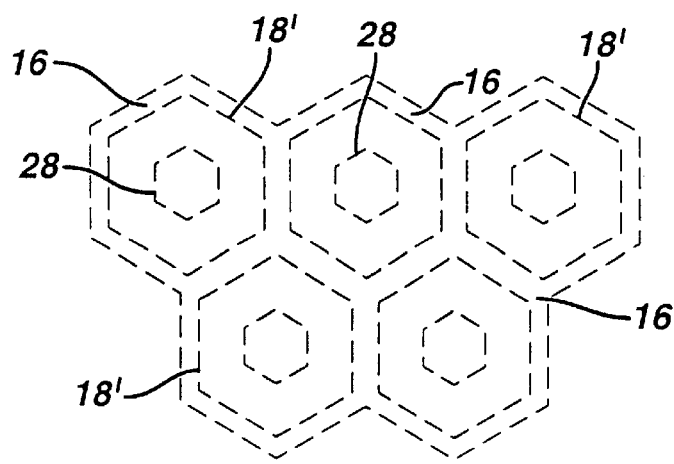

The purpose of the apertures 62 is to expose the underlying silicon dioxide film 54 to an etchant such as hydrofluoric acid which passes through the apertures and etches away the underlying oxide layers to form cavities 18 [FIG. 4h]. This leaves a silicon nitride diaphragm 60 supported by silicon nitride supports 66 with a conductive pedestal 28 below the diaphragm. The silicon nitride and the silicon substrate act as etch stops which define the size and shape of the cavity 18 of the cMUT cell. The final step is to form electrodes by applying a conductive film 70 to the upper surface of the silicon nitride diaphragm and a conductive film 72 to the lower surface of the substrate 50 [FIG. 4*i*]. Prior to forming the conductive film 70 the structure may be subjected to a further silicon nitride deposition which forms a layer 68 which seals the apertures 62. The silicon nitride deposition can be carried out under a vacuum so that the underlying cavity 18 may be at reduced pressure. Alternatively the apertures can be left open and the cMUT diaphragm operated at atmospheric pressure. A plan view of a transducer element of such cMUT devices is shown in FIG. 4*j*, in which the dark lined hexagons 18' define the cavities 18 of the devices, the cells share a common hexagonal patterned support 16, and the pedestals 28 share the same hexagonal shape as the cells. A continuous electrode 70 overlies all of the cMUT cells of FIG. 4*j*.

When the pedestal 28 is formed of a conductive material, the sticking problem is reduced. This is because the charge which maintains the capacitive plates in contact is quickly dissipated by the conductive material when the oppositely charged plates come into contact with each other. On the other hand, the discharge of the bias charge will render the cell inoperative until the bias is reestablished. This situation is avoided by the use of a high dielectric material for the pedestal. While continuing to present the possibility of sticking, should the opposing plates touch only momentarily or bounce so that sticking does not occur or the VanderWals forces be overcome by the torsion of the diaphragm material, the cell can continue to operate as the bias charge will not be dissipated by the contact of the high dielectric pedestal with the diaphragm.

Unlike the prior approach, the electrode 70 is not etched to create high resistance conductive paths to small electrode areas over each diaphragm. The electrode layer can be formed as a continuous layer covering the diaphragms of a plurality of cMUT cells, or as individual electrode areas each covering a majority of the diaphragm of a cell and preferably extending out to the cell support. The individual electrode areas are electrically connected to signal and/or bias circuitry by low impedance conductors, which may be formed of the same conductive layer as the electrodes. The low impedance electrodes and conductors provide efficient coupling to each capacitive cMUT cell on the wafer. The pedestal 28 can extend several microns from the substrate floor of the cell. When the bias voltage $V_B$ is applied to the device and the diaphragm is attracted to the pedestal 28, the spacing 42 between the diaphragm and pedestal can be on the order of approximately 0.25 μm, creating a high charge density at the center of the cell and providing good sensitivity and coupling for applied signals.

While the cMUT cells and pedestals are both shown as hexagonal shaped in the above example, different shapes for both can also be used. The pedestals could be rounded (e.g., circular or elliptical), rectangular (square), or have other polygonal shapes. The pedestals can share the same shape as the cavities defined by the support shape, or can have their own shape. A hexagonal cell with a circular pedestal is one example of this differentiation.

It is desirable that the electrical circuit formed by the cMUT device be simply a large variable capacitance. The use of an insulative material such as silicon nitride for the diaphragm will effectively create a small series capacitance in the cMUT circuit. This can be avoided by using a highly conductive material for the diaphragm. One way to accomplish this is to etch off the horizontal top layer of the silicon nitride film [FIG. 4*f*] by plasma etching, leaving the channels 56 filled with insulating silicon nitride supports. A highly conductive material such as doped polysilicon or a high strength refractory metal such as nickel or titanium is then deposited on the wafer to form the diaphragm material. Thus, the layer 60 will comprise a conductive diaphragm layer supported above the oxide islands 58 by insulating silicon nitride, and the finished cMUT cell will have a conductive diaphragm opposing the pedestal 28.

It will also be appreciated that the ratio of the support spacing 44 to the dielectric spacing can also be improved by suspending the pedestal from the center of the underside of the diaphragm 14, opposing the planar floor of the cell. That is, the diaphragm becomes a nonplanar structure rather than the floor of the cell. This additional mass on the diaphragm will lower the frequency of the diaphragm and hence the frequency of operation of the cMUT transducer, and will cause the variability of the devices to be sensitive to the amount of material used for the suspension, however.

Various conductive films and depositions can be used for the electrodes of the cMUT such as gold and aluminum. Instead of being applied to the lower surface of the substrate, the electrode 72 can be applied to the upper surface prior to deposition of the sacrificial layer 54. Polysilicon can also be a suitable material for the sacrificial layer. Other materials such as glass can be used for the substrate, in which case the substrate electrode is applied to the upper surface of the substrate. Details of the semiconductor processes and materials which may be used to construct an embodiment of the present invention are described in U.S. Pats. 5,982,709 and 6,004,832 which are incorporated herein by reference.

Since the cells 10 can be fabricated by standard semiconductor processes, other associated electronics for the cMUTs can be concurrently fabricated on the silicon substrate. Transmit or receive electronics for the transducer element such as amplifiers and high voltage drivers can be fabricated on the same substrate as the cMUT cells.

Figure 5:
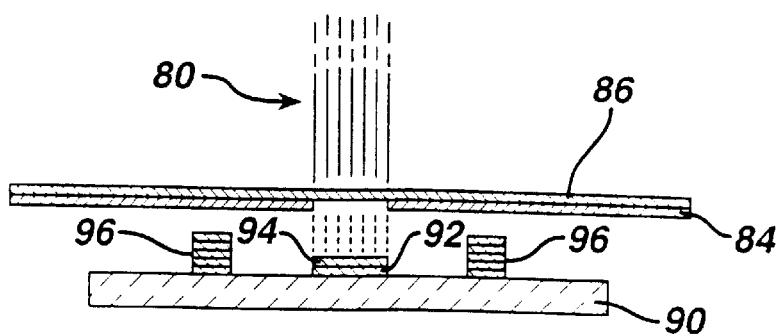
FIG. 5 illustrates the fabrication of a cMUT transducer by micro-stereolithography.

An array of cMUT cells may also be fabricated by other processes such as micro-stereolithography. In this process the cMUT structures are built up by depositing multiple layers of material through laser ablation. An advantage of this process is that cMUT cells can be built up on a wide range of substrates and using a wide range of cell construction materials. Substrate materials which are more absorbent to ultrasound than silicon or glass, and hence form better acoustic backings to the cMUT cells, such a polymers, plastics and rubberized compounds can be employed in such a process. These substrate materials can reduce unwanted acoustic coupling laterally through the substrate and out the back of the transducer. Shown in FIG. 5 is a polymer substrate 90 which is more absorbent to ultrasound than silicon or glass. A conductive film (not shown) is applied to the upper surface of the substrate 90 to form the lower electrode of the cMUT cell. The structure of the cMUT cell is then built up layer by layer on the substrate. For example, a carrier 86 carries a layer 84 of a material to be ablated for construction of the cMUT. For construction of the pedestal on the floor of the cell, the material 84 is a conductive material such as gold or aluminum. A laser beam 80 is directed to the area of the carrier from which the material 84 is to be deposited. The carrier 86 is transparent to the frequency of the laser beam so that the energy of the laser will ablate the material on the side of the carrier facing the substrate. When an infrared laser such as a YAG laser is used, for instance, the carrier may be Teflon. Successive layers of conductive material 84 are ablated onto the substrate to deposit layers 92,94 of the pedestal until the pedestal is built up to the desired height. The supports 96 for the diaphragm are insulative and can be formed by ablating layers of a polymer or plastic in the desired locations. A film for the diaphragm is overlaid over the cells and can be welded onto the top surfaces of the supports 96 by the laser. The thicknesses of the layers which can be deposited are determined by the laser power and the types of materials. For instance, metals, ceramics and plastics may be deposited in layers of approximately 1 µm or less. An ultraviolet wavelength laser such as an excimer laser or a laser operated at a visible wavelength can also be used for this process, with a corresponding choice of the carrier material.

Figure 6:
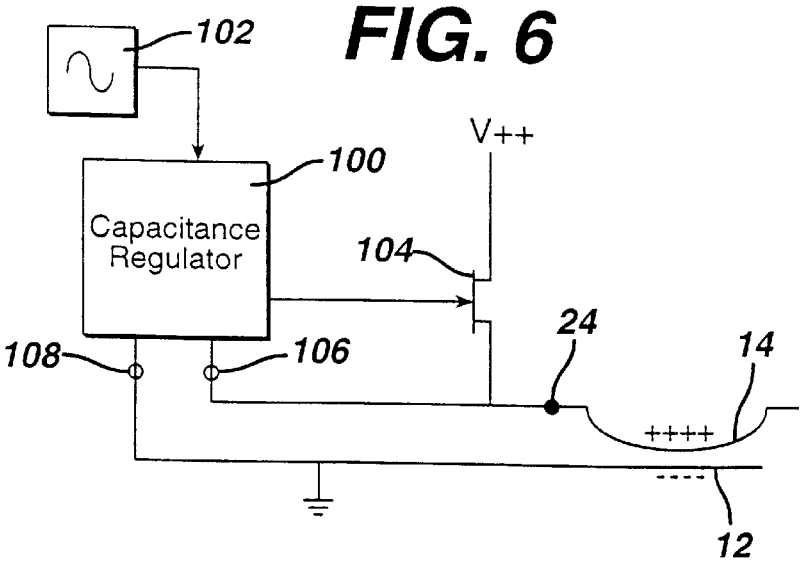
FIGS. 6 and 6a illustrate the generation and maintenance of a bias charge for a cMUT transducer.
Figure 6A:
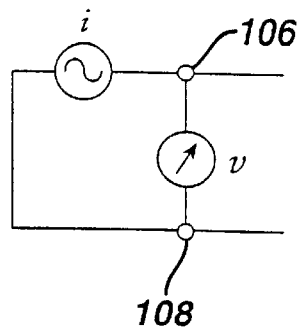

As mentioned previously a bias voltage $V_B$ is applied to the cMUT to prevent quadratic operation of the device and to distend the diaphragm to a position close to the oppositely charged base of the device for greater capacitive sensitivity. However, the capacitance of the cMUT cells can change over time, can differ from cell to cell on an array, and can differ from one array to another. As the capacitance changes the device draws more or less charge from the bias voltage source. This can cause the separation of the capacitive plates of the cMUT to change. As mentioned above, if the base and diaphragm plates come into contact with each other they can stick and render the cell inoperable. Furthermore, if the separation is not maintained at the optimum value, the performance of the device will be degraded. In accordance with another aspect of the present invention, a bias charge rather than a bias voltage is used to bias the cMUT cell. The bias charge can be applied by coupling a current source to the cell for a known amount of time, for example. A preferred embodiment of a bias charge source for a cMUT cell is shown schematically in FIG. 6. In this embodiment a current is selectively applied to the cMUT cell and the capacitance (or susceptance) of the cell is measured to adaptively adjust and maintain the bias charge of the cell. A field effect transistor 104 is regulated to apply a bias charge to the diaphragm electrode 14. A small a.c. signal from a signal source 102 is applied to the cMUT cell. The small a.c. signal may have a frequency of 10 kHz for instance. The resulting a.c. voltage produced on the cMUT device is sensed by a capacitance meter or regulator 100. The sensed a.c. voltage is used to compute the capacitance of the cMUT. The control signal applied to the field effect transistor is adjusted in accordance with the sensed capacitance to maintain or adjust the charge on the device and the process is repeated until the cMUT exhibits the desired capacitance and hence the proper bias charge. The operation of the capacitance meter 100 is shown in further detail in FIG. 6a. A small a.c. current i is applied to the cMUT cell (not shown) which is connected across terminals 106 and 108. The quadrature component of the a.c. voltage developed across the cell by the a.c. current is measured by a voltage meter v. The result of the measurement is adaptively used to charge or discharge the capacitive plates of the cell.

The cMUT capacitance is preferably periodically monitored by the capacitance regulator 100 during use of the cMUT transducer. It will be appreciated that a bipolar gated circuit will permit the diaphragm electrode 14 to be either charged and discharged as needed. In a preferred embodiment the bias charge circuit is constructed of elements which can be fabricated by semiconductor manufacturing processes and is integrated onto the same wafer as the cMUT so that the cMUT cells and their bias charge source are integrally fabricated and co-located.

Figure 7A:
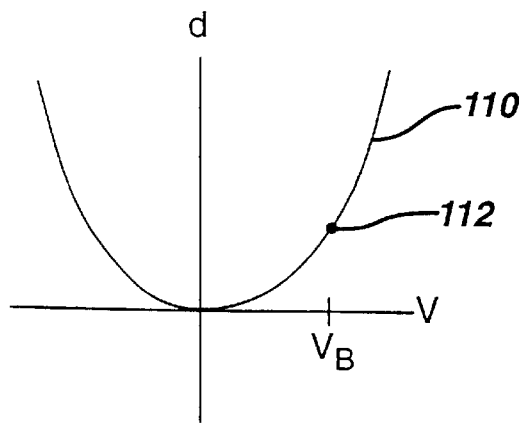
FIGS. 7a and 7b illustrate the nonlinear characteristic of a cMUT transducer.
Figure 7B:
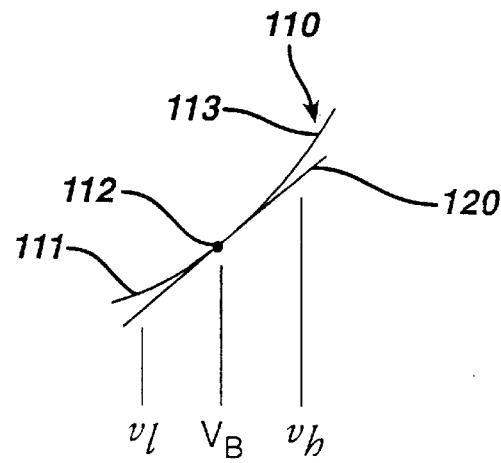

FIG. 7a shows a typical curve 110 illustrating the change in displacement d of the diaphragm 14 of a cMUT as a function of the applied bias charge or the resultant voltage $V_B$. To avoid the quadratic behavior of the device which occurs around the origin of the plot, the bias voltage $V_B$ shifts the nominal operating point 112 of the device to one side of the origin. In FIG. 7b the section of the curve 110 around the biased operating point 112 is shown in greater detail. The curve 110 is shown tangential to a straight line 120, which would be a desired linear characteristic for the device. The curve 110 is not linear, however. The lines denoted $v_l$ and $v_h$ mark the peak excursions of an a.c. drive signal which is applied to the cMUT to transmit an acoustic pulse or wave. As the drawing shows, the nonlinear curve 110 has a greater slope at the section 113 of curve 110 above the nominal operating point, and a lower slope at the section 111 below the nominal operating point 112. This means that the diaphragm will move nonlinearly when the cMUT is driven by transmit signal having peak to peak excursions of $v_l$ and $v_h$.

Figure 8B:
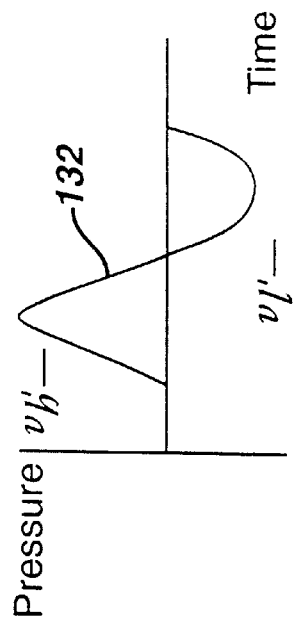
FIGS. 8a and 8b illustrate the effect of a nonlinear characteristic on a transmit waveform.
Figure 9B:
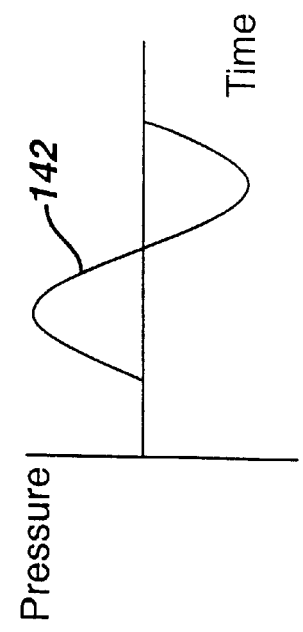
FIGS. 9a and 9b illustrate a transmit waveform resulting from the use of a predistorted transmit signal.
Figure 8A:
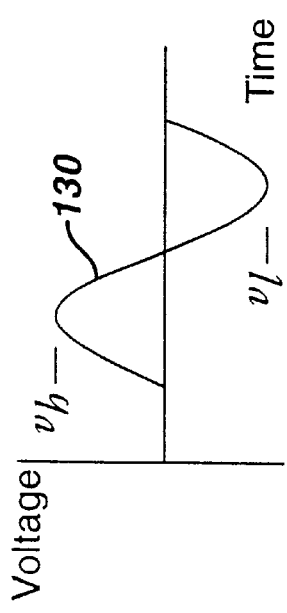
Figure 9A:
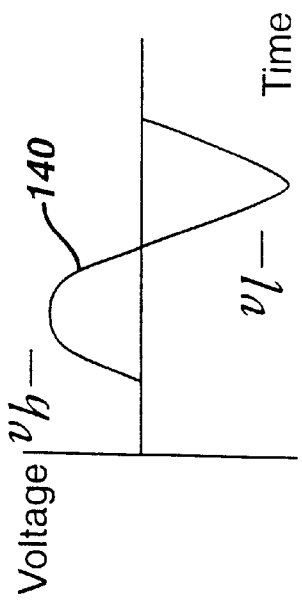

The effect of this nonlinearity may be appreciated by referring to FIGS. 8a and 8b. FIG. 8a depicts a sinusoidal waveform 130 used as the drive signal for a cMUT. This waveform is seen to have peak excursions of $v_h$ and $v_l$. When this waveform 130 is used to drive the nonlinear cMUT the resulting pressure wave 132 will have the characteristics depicted in FIG. 8b. The first, positive half cycle will exhibit an overshoot above the desired level of $v_h'$, and the second, negative half cycle will exhibit an undershoot below the desired level of $v_l'$ as the pressure waveform is distorted by the nonlinearity of the device. In accordance with a further aspect of the present invention the nonlinearity of the pressure waveform is overcome by predistorting the applied drive signal 140 as shown in FIG. 9a. For transmission of a sinusoidal pressure wave the first half cycle undershoots the desired vh level and is more rounded than the sinusoid, and the second half cycle overshoots the desired vl level and exhibits a sharper peak than the sinusoid. The application of this drive signal 140 to the cMUT will produce the sinusoidal pressure wave 142 shown in FIG. 9b.

The reduction or elimination of this nonlinear effect is important when the cMUT transducer is used for harmonic operation. In both contrast harmonic and tissue harmonic operation it is desirable to transmit a fundamental frequency waveform with minimal and preferably no spectral components in the transmit signal's harmonic band. The only harmonic signals sought during contrast harmonic operation are those returned by the nonlinear effect of the contrast agent, and the only harmonic signals sought during tissue harmonic operation are those produced by distortion of the pressure wave by the transmission medium. Transmitted signal components in the harmonic band would contaminate these desired signals. Predistorting the drive waveforms to account for the nonlinear performance of the cMUT devices will thus produce a transmitted pressure waveform with substantially less nonlinear distortion from the cMUT and hence less artifact which would contaminate the harmonic spectrum of the transmitted pulses.

What is claimed is:

1. A capacitive micromachined ultrasonic transducer cell comprising:
    a base plate which retains a first electrical charge;
    a diaphragm plate which retains a second electrical charge and is located in a capacitive relationship with the base plate;
    a dielectric separating the base plate and the diaphragm plate; and
    a source of bias charge comprising:
        an a.c. signal source;
        a circuit which selectively applies the a.c. signal to the cell;
        a measurement circuit, responsive to the applied a.c. signal, which determines the capacitance of the cell; and a variable charge source, coupled to the cell and responsive to the measured capacitance, which regulates the charge of the cell.

2. The capacitive micromachined ultrasonic transducer cell of claim 1, wherein the bias charge causes the diaphragm plate to be distended toward the base plate by coulombic force.

3. The capacitive micromachined ultrasonic transducer cell of claim 2, wherein the source of bias charge is coupled to at least one of the plates of the cell.

4. The capacitive micromachined ultrasonic transducer cell of claim 1, wherein the source of bias charge comprises a current source which is selectively applied to at least one of the plates for a given period of time.

5. The capacitive micromachined ultrasonic transducer cell of claim 1, wherein the cell is fabricated on a substrate, and wherein at least a portion of the source of bias charge is fabricated on the same substrate.

6. The capacitive micromachined ultrasonic transducer cell of claim 1, wherein the source of bias charge comprises a feedback control circuit.

7. The capacitive micromachined ultrasonic transducer cell of claim 6, wherein the feedback control circuit is responsive to the measurement of cell capacitance for regulating the bias charge of the cell.

* * * * *